Sept. 3, 1946.　　　　　J. R. MOORE　　　　　2,406,845
GYROSCOPIC DEVICE
Filed Jan. 22, 1943　　　　2 Sheets-Sheet 1
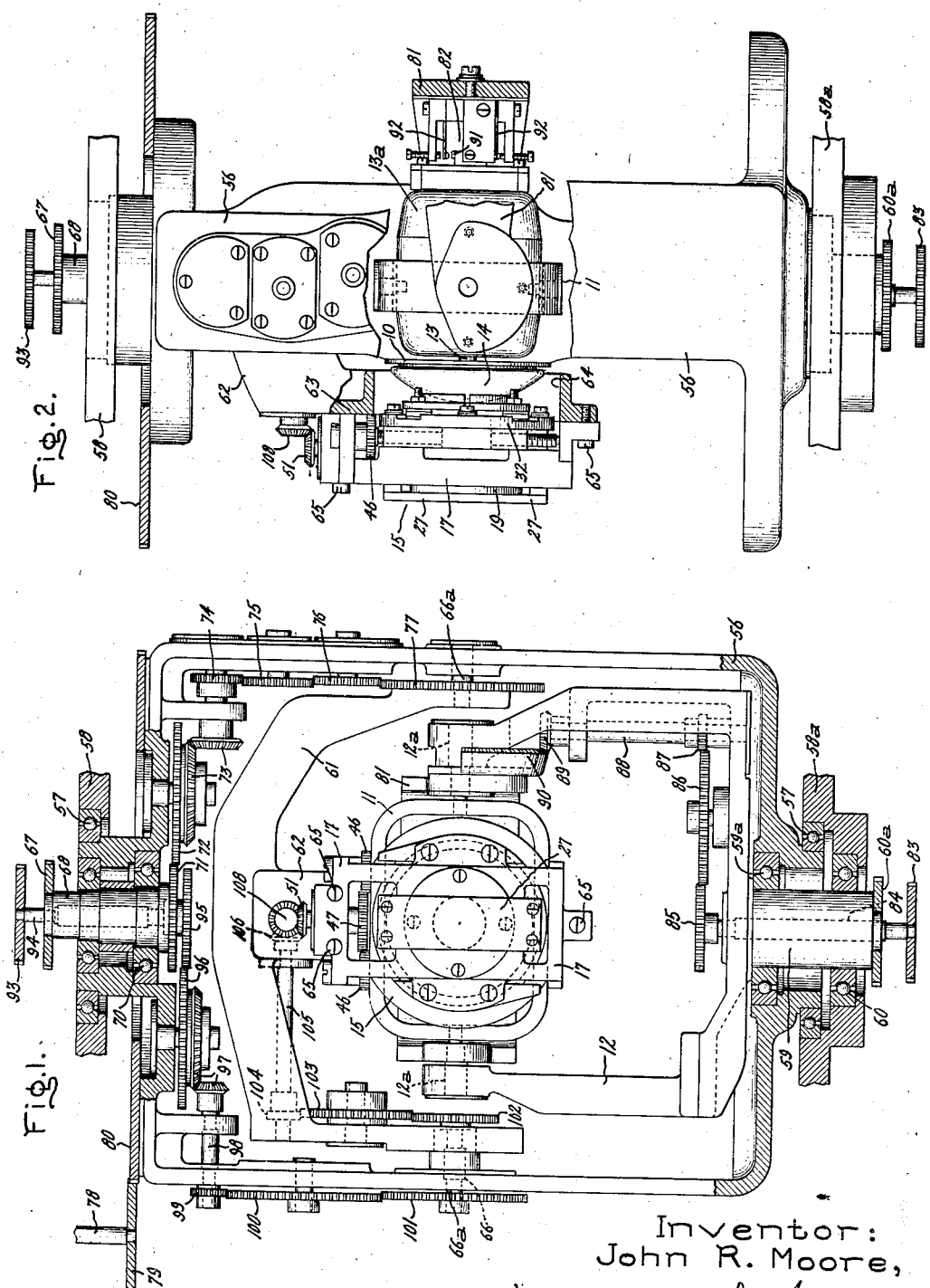
Inventor:
John R. Moore,
by Harry E. Dunham
His Attorney.

Sept. 3, 1946.   J. R. MOORE   2,406,845
GYROSCOPIC DEVICE
Filed Jan. 22, 1943   2 Sheets-Sheet 2
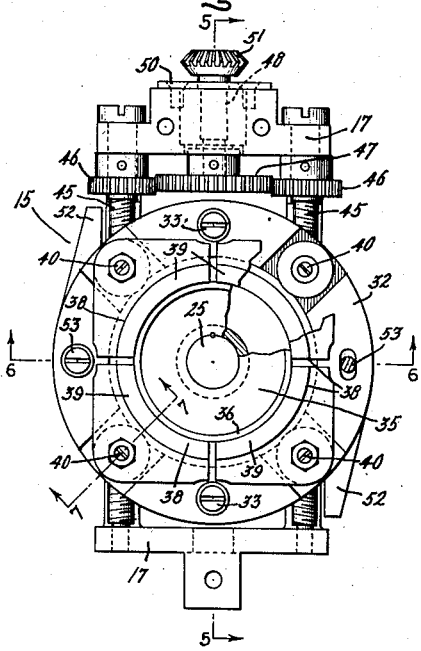
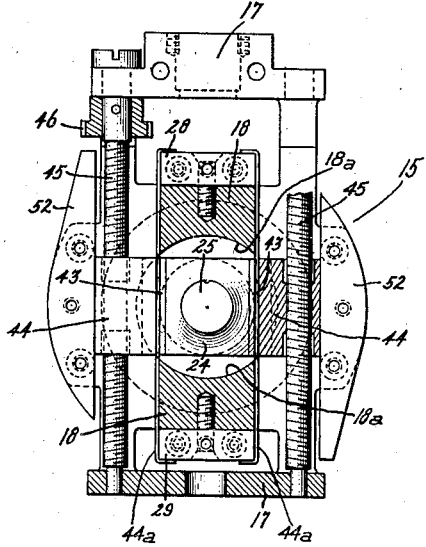
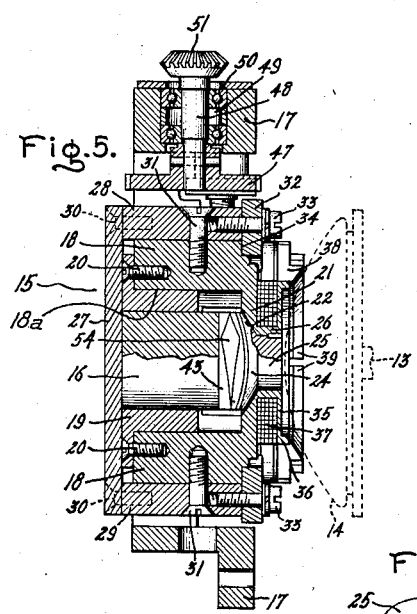
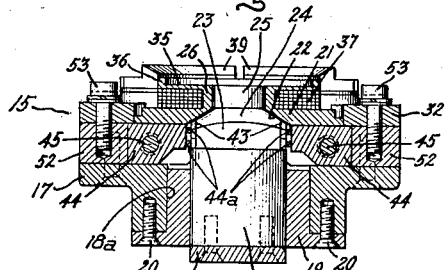
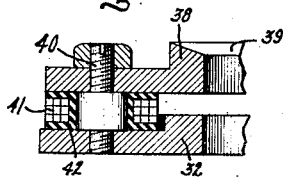
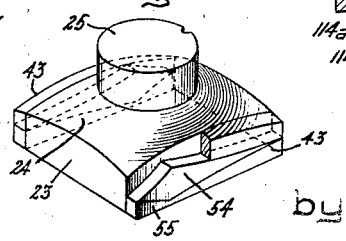
Inventor:
John R. Moore,
by Harry E. Dunham
His Attorney.

Patented Sept. 3, 1946

2,406,845

UNITED STATES PATENT OFFICE 2,406,845

GYROSCOPIC DEVICE

John R. Moore, Schenectady, N. Y., assignor to General Electric Company, a corporation of New York Application January 22, 1943, Serial No. 473,156

1 Claim. (Cl. 175—21)

This invention relates to a magnetic device, more particularly to such a device as is useful in connection with gyroscopic control devices, such as used in the control of gunfire, and it has for its object the provision of an improved magnetic device of this character.

While it has more general application, this invention relates to a magnetic structure for use in connection with a gyroscopic control of the type in which the position of the gyroscope is controlled by means of an eddy-current disk revolving in a magnetic field. In one device of this character, the eddy-current disk is carried by the gyroscope, and it revolves in a magnetic field which is generated by a magnet separate from the gyroscope. When the gyroscope and the magnet are relatively displaced, eddy currents are induced in the disk which apply a torque to the gyroscope which varies with the magnitude of the displacement between the gyroscope and the magnet and which tends to precess the gyroscope to bring its spin axis into a predetermined position with reference to the magnet.

One use for such a gyroscopic control device is to control the sighting mechanism for a gun. Such mechanism is described and claimed in the copending application of F. V. Johnson, Serial No. 459,780, filed September 26, 1942, and assigned to the assignee of this invention.

This invention contemplates the provision of an improved magnetic device of the aforementioned character having simple, reliable and efficient means for controlling and varying the magnetic flux linking the eddy-current disk in order to vary the erecting torque and thus the equilibrium position of the gyroscope for any given rate of precession.

Such variation in the magnetic flux has been obtained heretofore by employing an electrical network to vary the current in an erecting electromagnet. But such arrangements have not been satisfactory.

In accordance with this invention, the reluctance of the magnetic circuit including the eddy-current disk and the magnet is varied in order to vary the erecting torque. In one embodiment of this invention, this is accomplished by varying the area of a section of a control magnetic circuit; and in another form it is accomplished by introducing in the magnetic circuit an air gap which is variable in order to vary the magnetic reluctance of the circuit. In addition, in either case further control of the reluctance may be obtained by varying the shapes of the component parts forming the variable section, or of those forming the air gap.

For a more complete understanding of this invention, reference should be had to the accompanying drawings in which Fig. 1 is a vertical elevation of a gun lead computer provided with a gyroscopic control device embodying a magnetic device arranged in accordance with this invention, parts being shown in section so as to illustrate certain details of construction; Fig. 2 is a side elevation of the lead computer of Fig. 1, parts being broken away and parts shown in section so as to illustrate certain details of construction; Fig. 3 is an elevation of the gyroscopic control device used in the lead computer of Figs. 1 and 2, parts being broken away so as to illustrate certain details of construction, and the figure being drawn to a larger scale than Figs. 1 and 2; Fig. 4 is a sectional view of the device shown in Fig. 3; Fig. 5 is a sectional view taken through the line 5—5 of Fig. 3 and looking in the direction of the arrows; Fig. 6 is a sectional view taken through the line 6—6 of Fig. 3 and looking in the direction of the arrows; Fig. 7 is a fragmentary sectional view taken through the line 7—7 of Fig. 3 and looking in the direction of the arrows; Fig. 8 is a perspective view of an element of the magnetic device; and Fig. 9 is a sectional view illustrating a magnetic element for controlling the gyroscope which is of modified form, but is arranged in accordance with this invention.

Referring more particularly to Figs. 1 to 8 of the drawings, this invention in one form is shown as applied to a gyroscopic control device for use with apparatus for determining the lead angle of a gun, as required by the velocity of a target. The control device comprises a neutrally-suspended gyroscope 10 which is mounted in a gimbal ring 11 for movement about one axis. The ring is mounted in a U-shaped support 12 for movement about another axis at right angles to the gyroscope axis in ring 11, shafts 12a being carried by the ends of the two legs of the support for pivotally mounting the ring 11. The gyroscope is driven by a motor 13a having a driving shaft 13 connected to the wheel of the gyroscope. The axis of the shaft 13, of course, is the spin axis of the gyroscope.

The shaft 13 of the gyroscope motor rotates an eddy-current disk 14. The disk comprises a soft iron disk over which is spun a suitable electrically conducting sheet. The outer curved surface of the disk is approximately in the form of a segment of a sphere which has its center in the center of suspension of the gyroscope.

Positioned opposite the disk 14 is a magnetic control device 15 which is arranged to generate a magnetic field, the flux of which links the rotating eddy-current disk so as to form a magnetic coupling between the gyroscope and the magnetic control device. It will be understood that when the disk is rotating in the magnetic field, and the axis of the gyroscope is aligned with the magnetic axis of the device 15, no eddy currents are induced in the disk which will tend to precess the gyroscope. However, if the axis of the magnet departs from the axis of the disk, the motion of the disk in the magnetic field causes eddy currents to flow in the disk's conducting surface so that a resulting torque acts on the gyroscope which tends to precess it into alignment with the magnetic axis of the device 15. The magnitude of this torque varies with the angle between the gyroscope and the magnet, and with the strength of the magnetic coupling.

The magnetic device 15 comprises a permanent cylindrically-shaped magnet 16. This magnet is mounted in a supporting frame 17 which is made of some suitable non-magnetic material, such as aluminum. The frame 17 between its ends is formed with opposed sections 18 having opposed curved surfaces 18a (Fig. 4). The magnet 16 is received between these surfaces, a circular insert 19 being mounted between the sections 18 around the magnet, as shown; the insert 19 also is formed of a non-magnetic material, such as aluminum; and it is secured to the sections 18 by screws 20.

The right-hand ends of the two sections 18 carry a circular inturned flange 21, as shown, the inner side of which is provided with a beveled surface 22. Bearing against the surface 22 is a pole piece 23 (Fig. 8) which has a curved surface 24 complementary to the beveled surface 22. Extending outwardly from the center of the curved surface 24 of the pole piece is a cylindrical section 25 which is received in a cylindrical part 26 extending outwardly from the inturned circular flange 21. The pole piece 23, together with its cylindrical extension 25 are formed of non-hysteretic iron, and the cylindrical extension forms the central pole piece of the magnet.

The magnet is secured at its left-hand end, as viewed in Fig. 5 (its bottom end, as viewed in Fig. 6), by means of a bottom plate 27. The ends of this plate are fastened to the ends of a pair of side plates 28 and 29 (Figs. 4 and 5) by screw fastening means 30. These plates 28 and 29 are attached to the frame 17 by means of screws 31. The outer ends of the plates 28 and 29 are secured to a ring 32 by screws 33. The ring 32, as shown, seats in a recess 34 formed on the front of the frame 17.

The bottom plate 27, the side plates 28 and 29 and the ring 32, all are made of non-hysteretic iron.

The cylindrical flange 26 that surrounds the central pole 25 at its outer edge terminates in a wide circular flange 35 that is parallel to the flange 21 and which at its periphery has an outwardly extending annular flange 36. Interposed between the flanges 21 and 35 is an electromagnet winding 37 which functions as an auxiliary means for controlling the magnetic field.

Four cap pieces 38 formed of non-hysteretic iron are fitted to the outer surface of the outwardly extending flange 36, as shown in Figs. 3, 5 and 6. These members are provided with outwardly extending flanges which are shaped as quadrants of a circle, as shown. They are provided with inclined surfaces 39 which are substantially parallel with the outer curved surface of the disk 14, as shown in Fig. 5. The members 38 are formed of non-hysteretic iron and constitute outer pole pieces for the magnet 16. They are secured to the ring 32 by means of screw studs 40 that are formed of non-hysteretic iron.

The longitudinal axis of the central pole 25 passes through the center of suspension of the gyroscope; and the lengths and shapes of the pole pieces 25 and 38 are such that their ends lie substantially tangent to a spherical surface having its center at the center of suspension of the gyroscope.

Interposed between each outer pole piece 38 and the ring 32 are external coils 41 wound on spools 42. Preferably and as shown, the spools 42 surround the screw studs 40. These are for the purpose of setting up auxiliary fields for shifting the magnetic pole if it be desired to do so.

In view of the description thus far given, it will be understood that a magnetic circuit is set up which includes the pole piece 23, the central cylindrical pole 25, the eddy-current disk 14, the outer pole pieces 38, the screw studs 40, the ring 32, the end plates 28 and 29, and thence through the bottom plate 27 to the bottom end of the magnet. The lines of force of this field linking the eddy-current disk control the precession of the gyroscope to cause it to precess in such a direction as to tend to keep its spin axis coincident with the magnetic axis of the device. And as pointed out in detail previously, the magnitude of the erecting or restoring force depends upon the angle between the gyroscope and the magnet, and upon the magnitude of the magnetic coupling. This coupling is controlled by varying the number of lines of force linking the disk 14, and the number of lines is controlled by means of a secondary magnetic path connected in parallel with the primary path, and which is provided with means for controlling its reluctance so that the number of lines of force of the primary path are controlled.

The secondary path includes the magnet 16, of course, the pole piece 23, opposed side faces 43 of the pole piece 23, and a pair of non-hysteretic iron slides 44 movable parallel to the faces 43 respectively, and spaced from them by a slight air gap. Each slide bears on two parallel rods 44a to maintain the air gap and to function as anti-friction tracks for the slides. The positions of the slides are controlled by elongated non-hysteretic iron screws 45 upon which they are mounted, as shown. The screws are journaled in the frame 17, as shown, and they carry spur driving gears 46 at their upper ends. Interposed between and meshing with these gears is a driving gear 47, which is attached to one end of a shaft 48. This shaft is formed in a bearing 49 (Fig. 5) which is mounted in the frame 17, as shown. This bearing is secured in its operative position by an end plate 50 secured to the frame. Secured to the outer end of the shaft 48 is a driving bevel gear 51. The gears 46 and 47 are formed of a suitable non-magnetic material, such as aluminum. The gearing between the bevel gear 51 and the two slides 44 is such that the slides will be moved in opposite directions. The slides are provided with outer iron guide members 52 which are located between the ring 32 and the frame 17, as shown in Fig. 6, and which are secured to these members by screws 53.

The secondary magnetic circuit, therefore, extends from the outer end of the magnet, the pole piece 23 and the lateral faces 43 thereof, the slides 44, the guides 52, the ring 32, the end plates 28 and 29, and thence through the bottom plate 27 to the bottom end of the magnet 16.

The total number of lines of force in the primary circuit linking the eddy-current disk 14 depend upon the number of lines of force threading the secondary circuit. Thus, if the reluctance of the secondary circuit be increased, the number of lines in the primary circuit threading of the disk 17 will increase, and the erecting torque impressed on the gyroscope will increase; conversely, if the reluctance of the secondary circuit be reduced, the number of lines of force in the primary circuit threading the disk will be reduced and the erecting torque reduced.

The reluctance of the secondary circuit is controlled by controlling the positions of the slides 44 with reference to the faces 43 of the pole piece 23. When the slides 44 register with the faces 43, the reluctance of the secondary circuit is at its minimum, and the minimum number of force lines thread the primary path. The reluctance is increased as the slides 44 are moved in opposite directions away from their cooperating faces 43 in order to reduce the metallic areas through which the lines of force may pass. Of course, when the slides completely uncover the faces 43, the reluctance of the secondary circuit is at its maximum.

The reluctance of the secondary magnetic circuit is further controlled by controlling the shapes of the components of the variable reluctance section of the secondary path consisting of the surfaces 43 and the slides 44. As shown in Figs. 5 and 8, the magnetic parts 54 of these surfaces 43 have been given the shapes of elongated diamonds extending lengthwise across the faces. These shapes may be obtained by cutting away the metal from the surfaces in order to give the resultant diamond shapes. The cut-away parts may be filled in with a suitable non-magnetic material, such as silver solder sections 55 (Fig. 5), so as to make smooth and uninterrupted surfaces. The magnetic parts of the surfaces coacting with the slides 44, of course, vary the reluctance of the secondary circuit in a predetermined way as the slides move away from their positions of complete registry with the surfaces 43. The particular diamond shapes given the sections 54 are for use in a gun lead computer shown in Figs. 1 and 2, but the shapes given will depend upon the particular application of the gyroscope device.

The computer of Figs. 1 and 2, in addition to the gyroscope device described, comprises a rectangular-shaped frame 56 which partly supports the gyroscope device; the frame 56 is mounted for rotation on a fixed axis, located vertically as viewed in Figs. 1 and 2, on bearings 57 at the top and bottom, and which are located in fixed supports 58 and 58a.

The U-shaped bail 12 supporting the gyroscope ring bail 11 is mounted on a shaft 59 which is journaled in a bearing 59a carried in the frame 56 and in a bearing 60 mounted in the fixed support 58a, as shown, and it is driven by a gear 60a.

The frame 17 that carries the magnet 16 is supported by a U-shaped bail 61 which carries an extension 62 for the frame 17. The extention 62, as shown, has a depending part 63 having therein a circular aperture 64 (Fig. 2). The frame 17 is attached to the extension 62 so that the magnet poles 25 and 38 are received in the aperture 64; and also received in the aperture 64 is the eddy-current disk 14, as shown in Fig. 2. The frame 17 is rigidly attached to the extension 62 and its depending part 63 by screws 65.

The bail 61 is provided with shafts 66a which are journaled in bearings 66 provided for them in the sides of the frame 56. The bail 61 is adjustable in its bearings 66 by means of an input gear 67 which is attached to a shaft 68 that is journaled in bearings 70 mounted on the frame 56. The shaft 68 protrudes into the frame, as shown, and on its inner end is secured a spur gear 71. This gear drives the bail 61 supporting the magnet through a spur gear 72, bevel gears 73, and spur gear train 74, 75 and 76 which drives a spur gear 77 secured to the bail. Motion is imparted to the magnet on an axis at right angles to the motion imparted to it by the movement of the bail 61 in its bearings 66 by moving the frame 56 in its bearing 57. For this purpose, an input drive shaft 78 is provided which drives a spur gear 79; this gear 79 in turn drives a large spur gear 80 attached to the frame.

The gyroscope 10 is moved on an axis coincident with the axis of support of the frame 56 by means of the bail 12 in its bearings 59a and 60. This is effected through the gear 60a. The gyroscope is movable on an axis at right angles to the axis of rotation of the bail 12 by a bail-like frame 81 of U-shape. The ends of the two legs of this frame 81 are pivoted to the shafts 12a between the legs of the bail support 12 and the gyroscope gimbal ring 11, as shown. The bail 81 drives the gyroscope on the shafts 12a through a switch 82 which acts as a stop. The bail 81 is driven through a spur gear 83 secured to a shaft 84 and which is journaled in the shaft 59. The shaft 84 drives a spur gear 85 which in turn drives a spur gear 86 and through this gear drives a gear 87 on a shaft 88. The shaft 88 operates a bevel gear 89 which drives a bevel gear sector 90 secured to the frame 81.

This switch 82 comprises a pair of spaced contacts 91 mounted one above the other on the gyroscope and a pair of cooperating spaced contacts 92 positioned one above the other and carried by the frame 81. A similar pair of sets of contacts (not shown) are positioned at right angles to the first pair of sets just described. When the frame 81 is moved on its two axes a pair of the contacts 92 at right angles to each other will engage their contacts 91 on the gyroscope and will move it on its two axes. A further function of the switches will be described hereinafter.

The reluctance slides 44 of the magnetic device are driven by a spur gear 93 which drives a shaft 94 journaled in the shaft 68; shaft 94 drives a spur gear 95 which through a spur gear 96 drives bevel gears 97; these gears 97 in turn drive a shaft 98 and this shaft drives a gear train consisting of spur gears 99, 100 and 101. This train drives shaft 66a of the bail 61, which shaft drives bevel gears 102, 103 and 104. Gear 104 drives a shaft 105 which drives a bevel gear 106. This gear drives a shaft 107 which in turn drives a bevel gear 108 geared to the bevel gear 51 of the magnetic device 15.

Generally the lead computer of Figs. 1 and 2 operates as do the lead computers described and claimed in the afore-mentioned F. V. Johnson application. But here the gyroscopic control device is remotely positioned both from the sight (not shown) and the gun (not shown). Therefore, here suitable motors (not shown) that are controlled in accordance with the sight's movements are provided to control the movements of the magnetic device 15 and of the gyroscope 10. One motor responds to the sight's movement in train to drive the gear shaft 78 to turn the frame 56 and hence the magnet in train and also to operate the gear 60a to operate the gyroscope frame 81 in train through the angular movements of the sight in train. Another motor drives the gear 67 to operate the magnet in elevation and also the gear 83 to drive the gyroscope frame 81 in elevation by the angle of movement of the sight in elevation. As the frame 81 is moved in train and elevation two pairs of the contacts 91 and 92 at right angles will close and will move the gyroscope with the frame. But the position of the gyroscope in space will lag behind that of the magnet, and if free, would lag by an amount dependent upon the velocity of the movement of the magnet and the coupling coefficient set by the gear 93. Here, of course, the gyroscope can lag only by the spacing between the contacts 91 and 92. But the forces tending to cause it to lag will be the same and, therefore, the aforementioned contacts will remain closed. The contacts drive additional motors (not shown) which are connected in the motor drives for the magnet train gear shaft 78 and its elevation gear 67 so that the magnet is further displaced with reference to the gyroscope by the train and elevation lead angles, as required by the speed of the target just as in the Johnson case, the gyroscope and magnet will be displaced by these angles. This assumes that the gear 93 will have been set to adjust the magnet slides 44 in accordance with a correct function of the range of the target.

The motors and their intimate controls responsive to the sight and the auxiliary motor operated by the switch 82, and the gearing and mechanism necessary to control the motions of the magnet and the gyroscope controlling bails 12 and 81 form no part of this invention, and it is believed to be unnecessary to describe such apparatus in detail.

In Fig. 9 there is illustrated a modification of this invention in which the reluctance of the primary magnetic circuit which links the eddy-current disk is controlled. Here the eddy-current disk is indicated by the numeral 109. The permanent magnet 110 is mounted in a central opening of a bushing 111 which is formed of some suitable non-magnetic material, such as aluminum or brass. The magnet is provided with a nose 112 formed of non-hysteretic iron, and which coacts with a non-hysteretic iron central core 113 which forms the central pole of the magnet. The outer poles 114 also are formed of non-hysteretic iron and, as shown, they are connected to the bottom of the permanent magnet 110 through inturned flange 114a and non-hysteretic iron collar 114b. The primary magnetic path includes the magnet 110, its iron nose 112, the central pole 113, the disk 109 and the outer poles 114 that are connected with the bottom of the magnet.

It will be observed that the nose 112 is tapered and that it coacts with a tapered recess 115 provided in the central pole piece 113. The magnet is adjustable up and down, as viewed in Fig. 9, in order to vary the air gap between the nose 112 and the pole 113. This is accomplished by means of an adjusting screw 116 which is threaded in a bushing 116a, and is received in an opening in the magnet, as shown, so that when the screw is turned it adjusts the axial position of the magnet with reference to the central pole.

The nose 112 and the complementary recess 115 in which it is received have a predetermined shape so that when the nose is moved in and out of the recess the reluctance of the magnetic path is varied in a predetermined way as a function of a variable. The particular complementary shapes given the nose and the recess depend upon the flux characteristics desired.

In addition, the nose 112 and the recess 115 may be shaped so that the reluctivity of the magnetic circuit is varied as a function of another variable by effecting relative rotary motion between the magnet and the pole piece 113; in this case the nose 112 and the recess 115 will be given predetermined non-symmetrical shapes. For example, the nose may be provided with a flattened plane section 117.

In other words, the reluctivity of the magnetic circuit depends both upon the relative angular and axial positions of the nose 112 and the recess 115, and is controllable as a function of two variables.

The magnet 110 may be rotated by means of a thumb screw 118 which drives a spur gear 119 that meshes with a spur gear 120 mounted on the magnet.

Also, the reluctivity of the circuit may be controlled by means of a control parallel magnetic circuit. This parallel circuit may be defined by a lateral extension 122 on the nose 112 which coacts with a protuberance 123 formed on the outer poles 114, which protuberance has a predetermined shape. The protuberance is such that when the extension 122 is rotated the reluctance of the parallel circuit will vary. This will vary the number of lines of force of the primary path that includes the disk 109.

While I have shown particular embodiments of my invention, it will be understood, of course, that I do not wish to be limited thereto since many modifications may be made, and I, therefore, contemplate by the appended claim to cover any such modifications as fall within the true spirit and scope of my invention.

What I claim as new and desire to secure by Letters Patent of the United States is:

A magnetic device comprising a magnet for generating a magnetic flux, means defining a flux path threaded by said flux and constituting a first magnetic circuit, means forming a second flux path constituting a second magnetic circuit parallel to said first magnetic circuit, and including a member aligned with said magnet, and movable elements on opposite sides of said member having surfaces facing along the side surfaces of said member, said movable elements being movable in opposite directions away from registry with said side surfaces, and means for shifting said elements simultaneously with reference to said side surfaces in order to vary the reluctance of said second magnetic circuit.

JOHN R. MOORE.